Figure 1:
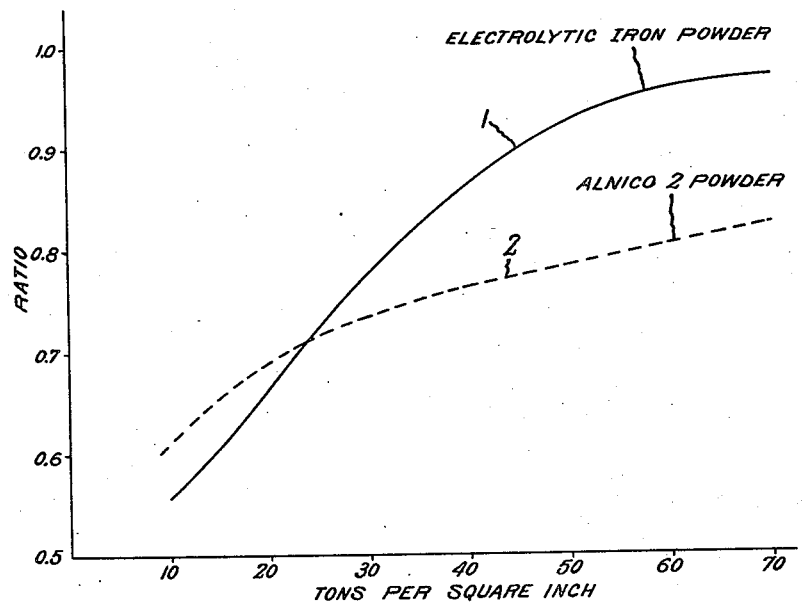

Sept. 15, 1953  R. J. STUDDERS  2,652,520
COMPOSITE SINTERED METAL POWDER ARTICLE
Filed Dec. 24, 1949

RATIO OF PRESSED DENSITY
TO MAX. SINTERED DENSITY
VS.
COMPACTING PRESSURE.

Inventor:
Robert J. Studders,
by His Attorney.

Patented Sept. 15, 1953

2,652,520

UNITED STATES PATENT OFFICE 2,652,520

COMPOSITE SINTERED METAL POWDER ARTICLE

Robert J. Studders, Schenectady, N. Y., assignor to General Electric Company, a corporation of New York Application December 24, 1949, Serial No. 134,934

4 Claims. (Cl. 317—201)

The present invention relates to sintered metal powder articles. It is particularly concerned with sintered powder metallurgy products comprising an insert portion and a body portion composed of different metal powders which when compacted at the same pressure would possess different rates or degrees of shrinkage during sintering and to a method of making such composite metal products.

While the invention is broadly applicable to any sintered metal product composed of an insert portion of a composition different from that of the main body portion, for convenience, the invention will be specifically described with reference to sintered Alnico magnets comprising a relatively soft and machinable powdered metal insert.

It is well known that the Alnico magnet alloys are extremely hard and cannot readily be drilled or machined. For that reason, various methods have been proposed for providing sintener Alnico parts with drillable or machinable portions. For example, in the manufacture of parts to be mounted on a support by means of a screw or bolt, the standard practice has been to core a hole in the pressed powder piece during the pressing operation, then prepartory to sintering the pressed piece, a soft steel insert with a fine diamond knurl is fitted into the cored hole. This combination is put through the normal sintering operation and the shrinkage occurring in the Alnico compact will cause it to shrink tightly around the knurled insert. Any necessary machining prior to mounting the sintered magnet then may be easily done on the soft insert.

There are several disadvantages to this method. The insert necessary for this type of work is complicated and expensive. The sintered Alnico does not form a substantial bond with the machined inserts and consequently a fine diamond knurl must be put on the insert surface which is in contact with the cored hole to prevent its loosening in the finished magnet. Also, to maintain the insert in its proper position in the cored hole of the pressed compact prior to and during the early sintering, a snug fit must be maintained between the parts. Such a fit demands, in addition to a knurl, a close tolerance, and the absence of burrs, etc. on the critical dimensions of the insert. Further, as there is a significant amount of shrinkage in the Alnico compact and virtually none in the solid insert, considerable distortion and stress, particularly in the sintered material adjacent the insert, are usually encountered. If the wall thickness of the magnet is small relative to the size of the insert, the tendency for the magnet to shrink may be great enough to rupture the compact during the sintering and render it useless. The more usual case with a small insert and large magnet, the magnet is constrained in one direction by the insert with a resulting tendency for the magnet to bulge out around the insert. It is then necessary to waste valuable material with a grinding operation to remove the excessive bulge.

A second known method described, for example, in Britist Patent 576,754 comprises the introduction into the machinable insert or portion into the die in the form of a preformed element, e. g., of cast iron, along with the powdered Alnico, pressing the insert portion into contact with the powdered Alnico during compacting of the latter and subsequently sintering the pressed body. This is a complicated method mechanically and is subject to the same shrinkage disadvantages as the above-mentioned method.

The disadvantages of these prior methods and articles are obviated in accordance with the present invention by forming the composite body from separately pressed or compacted portions of the two or more different metal powders, which before firing but after pressing are assembled in contacting relationship in their final form so that during the sintering operation the portions sinter together and form a single unitary body. A specific feature of the present invention is the pressing or compacting of the two portions or parts prior to assembly at pressures such that upon subsequent sintering in their assembled position, the parts will shrink the same or approximately the same amount thereby eliminating the distortions and stresses characterizing the products of the known methods.

Figure 2:
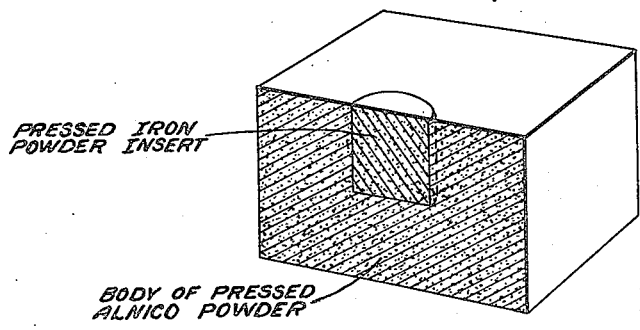

The manner in which the present invention may be carried into effect will be described with reference to the accompanying drawing in which Fig. 1 shows the relative shrinkage of powdered iron and a specific powdered Alnico as a function of compacting pressure, and Fig. 2 is a view of the assembled powdered metal parts prior to sintering thereof.

Briefly described, the process of the present invention which is both simple and inexpensive can be carried out in the following manner. A hole is cored in the pressed powder piece in accordance with the usual practice and an insert is prepared by separately pressing or compacting a suitable powdered metal or alloy. For example, in the case of Alnico with a magnetic insert, iron powder is pressed in a pelleting machine with its density controlled and its dimensions determined by the size of the die, etc. This pressed iron compact is then inserted in the cored hole as shown in Fig. 2 of the drawing and the combination compact is sintered as before. The pressed Alnico and pressed iron insert sinter together during the sintering operation with a resulting strong bond. The simultaneous shrinkage of the iron compact may be adjusted to eliminate all or much of the distortion and stress of the older method. Using a variation of density in the pressed insert the shrinkage resulting during sintering may be closely controlled. A mixture of powders may be used in the insert to secure bonding or regulate physical, magnetic, or the electrical properties of the insert. In the case of Alnico the sintered iron insert is very soft and may be easily machined for mounting purposes.

For best results, the powders respectively employed in making the insert portion and the adjacent main body of the final piece should be compacted at pressures which will result in the same or about the same volumetric shrinkage during sintering. This feature of the invention will best be understood from a consideration of two representative materials, powdered Alnico 2 (10% Al, 17% Ni, 12.5% Co, 6% Cu, bal. Fe in which the aluminum is present as an iron-aluminum alloy) and pure iron powder. The curve in Fig. 1 of the accompanying drawing shows the relative shrinkage of these two powders as a function of the compacting pressure. The shrinkage is shown as the ratio of pressed density to maximum sintered density usually obtained. Such information is of course available or readily obtainable for any powdered metal or alloy. It will be seen that the volumetric shrinkage of the two materials is about the same in the region of twenty-five tons per square inch pressure. Unless compacted in this pressure region, shrinkage variations will be quite large. In actual practice much higher compacting pressures must ordinarily be used to reduce the amount of shrinkage obtained which will tend to eliminate distortion, enables closer tolerances to be held. Furthermore, high pressures usually lead to better magnetic properties with shorter sintering times. In the case of Alnico 2, pressures of 60 to 90 tons per square inch are usually used. Obviously, iron powder compacted simultaneously with Alnico at these pressures would shrink much less than the Alnico on sintering, and lead to cracking or distortion.

For a more detailed explanation of this feature of the invention, there may be considered the manufacture of a disc-shaped Alnico 2 rotor with a machinable insert in its center for mounting purposes. Such a rotor must be capable of withstanding high rotational stresses in its operation so no undue stress can exist between the Alnico body and the center insert.

One type of rotor of this type has an outside diameter of 1.000 in. and inside diameter of 0.300 in. and a thickness of 0.250 in. In accordance with the present invention and allowing for shrinkage, an Alnico compact is pressed in a die so dimensioned that the pressed part will have an outside diameter of 1.065 in. and an axial hole or aperture of 0.320 in. Usually, the proper quantity of Alnico powder is pressed in such a die at a pressure of 60 tons/sq. in. The powdered iron insert for the rotor is separately pressed in the form of a cylindrical slug having an outside diameter of 0.319 in. A reasonably tight fit between the insert within the hole cored in the pressed Alnico portion is desirable to assure proper positioning after sintering.

Since in this example, the Alnico was pressed at 60 tons/sq. in., the iron powder should be pressed at a pressure such that it will have about the same volumetric shrinkage as the Alnico. Referring to the curves in the accompanying drawing, it will be seen that to obtain the same pressed density-to-maximum sintered density in the powder iron compact as was obtained in the Alnico powder pressed at 60 tons/sq. in., the iron powder should be pressed at a pressure of slightly less than 33 tons/sq. in.

Usually, to assure a tight bond, it is found desirable that the two compacting pressures be such that after sintering the insert will be under some compression by the main portion of the sintered article insufficient to cause any noticeable bulging of the sintered piece. In other words, the two pressures should be such that the powder metal insert shrinks slightly less, for example, up to about 5 percent less, during sintering than does the surrounding main body portion.

After separately pressing the two compacts at the related pressures, the iron compact is inserted into the hole cored in the Alnico compact and the assembly sintered to produce a sintered article with a minimum of distortion and stress, free of the surface bulges ordinarily found around the periphery of the solid metal inserts sintered into powder compacts by the methods known heretofore.

While the invention has been specifically described with reference to certain metal or alloy powders, it obviously is applicable to the manufacture of any composite metal articles comprising inserts of a composition and shrinkage different from the main body portion of the article. It will also be understood that the terms "insert" and "body portion" as used herein and in the claims are in no way limiting as regards the relative size or function as distinguished from the relative position thereof, the term "insert" denoting the surrounded part of the composite body and the term "body portion" referring to that part of the article surrounding the insert.

What I claim as new and desire to secure by Letters Patent of the United States is:

1. The method of making a sintered Alnico magnet having a machinable metal insert which comprises forming a compact of powdered Alnico, coring said compact to receive an insert, forming an insert of a machinable powdered metal by compacting said powdered metal at a pressure such that during sintering its shrinkage characteristics will approximate those of the Alnico compact, placing the insert in the cored Alnico compact and thereafter sintering the assembled compacts to form a composite body in which the insert is bonded by sintering to the Alnico.

2. A composite sintered metal article composed of separately compacted insert and body portions of different powdered metal compositions compacted at different pressures such that they exhibit approximately the same shrinkage characteristics during sintering of the composite article.

3. A composite body consisting of a sintered Alnico magnet having a machinable metal insert, both said magnet and said insert being separately formed by compacting suitable metal powders at different pressures such that their individual shrinkage characteristics and the shrinkage characteristics of the composite body during sintering are approximately the same.

4. A sintered Alnico magnet having a machinable sintered iron insert, the powders comprising said magnet and said insert being separately compacted and thereafter assembled before sintering, said insert being compacted at a pressure substantially less than the Alnico powder whereby the entire assembly will have approximately the same shrinkage characteristics during the sintering thereof.

ROBERT J. STUDDERS.

References Cited in the file of this patent

UNITED STATES PATENTS

| Number | Name | Date |
|---|---|---|
| 1,982,689 | Polydoroff | Dec. 4, 1934 |
| 2,048,222 | Rehmann | July 21, 1936 |
| 2,191,936 | Lenel | Feb. 27, 1940 |
| 2,275,420 | Clark | Mar. 10, 1942 |
| 2,279,831 | Lempert | Apr. 14, 1942 |
| 2,432,819 | Schumacker | Dec. 16, 1947 |

FOREIGN PATENTS

| Number | Country | Date |
|---|---|---|
| 576,754 | Great Britain | Apr. 17, 1946 |